Nov. 27, 1956 — J. M. BROWNLOW — 2,771,969
METHOD FOR JOINING METALLIC AND CERAMIC MEMBERS
Filed Nov. 26, 1952
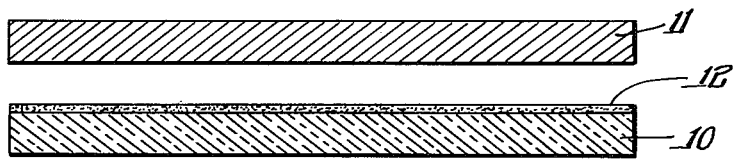
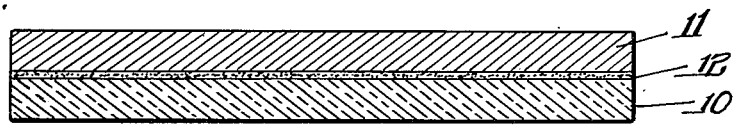
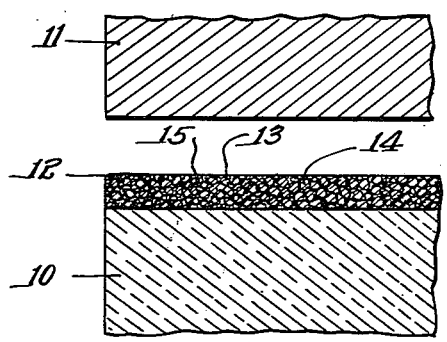
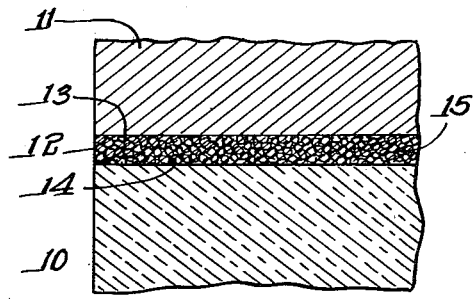
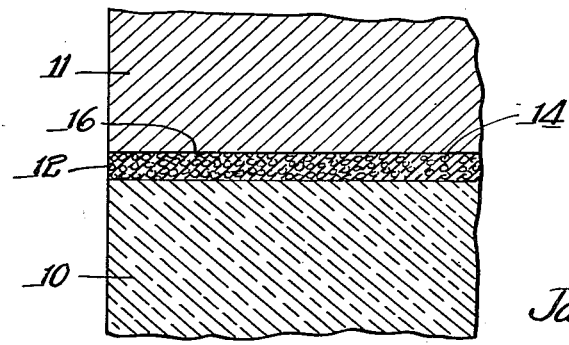
INVENTOR.
James M. Brownlow
BY
Wallenstein + Spangenberg
Atty.

United States Patent Office 2,771,969
Patented Nov. 27, 1956

2,771,969
METHOD FOR JOINING METALLIC AND CERAMIC MEMBERS

James M. Brownlow, Metuchen, N. J., assignor to Gulton Industries, Inc., a corporation of New Jersey Application November 26, 1952, Serial No. 322,731

7 Claims. (Cl. 189—36.5)

The principal object of this invention is to provide an improved method for firmly physically and electrically conductively joining a metallic member to a ceramic member.

Briefly, the method includes forming a joined assembly by juxtapositioning the metallic member and the ceramic member and interposing between and contacting the same with a bonding layer consisting essentially of finely divided silver and finely divided glass suspended in a carrying vehicle. This joined assembly is then heated to a temperature sufficient at least to sinter or melt the glass component of the binding layer whereby to bond the layer to the ceramic and metallic members. The joined assembly is then cooled to solidify the bonding layer with the finely divided silver component dispersed therein whereby firmly physically to bond together the metallic and ceramic members and electrically conductively to join the same.

Another object of this invention resides in the joined assembly produced by the aforementioned method, the joined assembly including a metallic member firmly physically bonded and electrically conductively joined to a ceramic member by a bonding layer consisting essentially of solid glass with finely divided silver dispersed therein and firmly bonded to the metallic and ceramic members.

The method of this invention and the article produced thereby are decided improvements over conventional methods and the articles produced thereby. In the conventional methods it has been the practice to presilver and fire the ceramic member to provide a silver surface on the ceramic member and then to soft solder the metal member thereto with tin-lead or silver alloy solders. The joint or bond of this invention between the ceramic and metallic members will withstand high service temperatures, for example up to 800 degrees F. or the like, where most soft solders are molten, it has a higher electrical conductivity than soft solders resulting in better electrical contact between the ceramic and metallic members, and it permits the joined assembly to be coated with or encased in resins of high molding temperatures or glass enamels of high melting point. The joined assembly made in accordance with the method of this invention is particularly adaptable, in view of its foregoing characteristics, for use in ceramic dielectric capacitors for high frequency purposes and the like.

Other objects and advantages of this invention will become apparent to those skilled in the art upon reference to the accompanying specification, claims and drawing, in which:

Fig. 1 is a sectional view of juxtapositioned metallic and ceramic members with a bonding layer applied to the ceramic member;

Fig. 2 is a sectional view similar to Fig. 1 but illustrating the metallic and ceramic members firmly physically bonded together;

Fig. 3 is an enlarged partial sectional view of a portion of Fig. 1;

Fig. 4 is a view similar to Fig. 3 but illustrating the metallic and ceramic members brought together and before heating;

Fig. 5 is a view similar to Figs. 3 and 4 but illustrating the metallic and ceramic members firmly physically bonded together.

The ceramic and metallic members to be bonded together are designated respectively in the drawings as 10 and 11. They are bonded together by a bonding layer 12. The ceramic and metallic members 10 and 11 may be of any desired configuration but for purposes of illustration are shown to be plates or the like.

The ceramic member 10 may be of a wide variety of compositions of which titanate dielectric, steatite, porcelain, or glazed ceramics and glass are a few examples. The metallic member 11 is such that it will resist temperatures of 1000 degrees F. to 1600 degrees F. without oxidation or corrosion and may, for example, comprise silver, silver plated copper, silver plated brass, silver alloys, and iron-nickel, nickel-manganese, and iron-chromium-nickel alloys.

The bonding layer 12 which provides the adhesive agency between the ceramic and metallic members 10 and 11 may take the form of a paint or the like which may be applied to the ceramic or metallic members by brushing, spraying or dipping. The paint forming the bonding layer includes finely divided glass, designated at 13 in Figs. 3 and 4, which sinters or melts when the paint is heated to a temperature ranging from 1000 degrees F. to 1600 degrees F. It also includes finely divided silver designated at 14 in Figs. 3 to 5. The finely divided silver may be in colloidal form or in the form of an organic silver salt or a mixture of the two. The glass component 13 and the silver component 14 are suspended in a carrying vehicle 15 such as an organic resinous vehicle formed of varnish or the like or a synthetic resinous vehicle formed of vinyl resins, cellulose acetate, methyl methacrylate, butyl methacrylate, or the like. The resinous carrying vehicle 15 preferably includes a suitable solvent for the resin so that the paint or binding layer may be applied to the ceramic or metallic members 10 and 11 as a paint by brushing, spraying or dipping.

As shown in Fig. 3 the bonding layer 12 including the glass component 13, silver component 14, and carrying vehicle 15 provided with a suitable solvent, is applied to the ceramic member 10. The metallic member 11 is then placed over the ceramic member with the bonding layer 12 interposed therebetween to form a joined assembly which is then preheated for the purpose of removing the solvent from the bonding layer, the joined assembly in this condition being illustrated in Fig. 4. Here the finely divided glass 13 and finely divided silver 14 are suspended in the carrying vehicle 15, even though the solvent for the carrying vehicle has been removed.

The joined assembly is then heated to a temperature between 1000 degrees F. and 1600 degrees F. to melt or at least sinter the finely divided glass 13. When this melting or sintering takes place, the glass particles 13 melt or fuse together and the layer is bonded to the ceramic and metallic members. At the same time the resinous carrying vehicle is destroyed and in effect is replaced by the fused glass. The joined assembly is then cooled to solidify the bonding layer in the form of a solid glass layer 16 having the finely divided silver component 14 dispersed therein. This solidification of the glass component into a solid layer 16, as illustrated in Fig. 5, firmly physically bonds together the ceramic and metallic members 10 and 11 and the finely divided silver component 14 dispersed therein electrically conductively joins together the ceramic and metallic members 10 and 11.

Typical examples of the ceramic and metallic members and the bonding layer including its various components which have proven particularly successful are as follows:

Ceramic

Dense multi-crystalline ceramic shapes formed by usual ceramic techniques:

Formula 1:                                   Percent by weight
- $TiO_2$ — 88
- $ZrO_2$ — 5
- $MgTiO_3$ — 5
- Clay — 2

Formula 2:
- $BaTiO_3$ — 88
- $BaZrO_3$ — 8
- $MgZrO_3$ — 4

Formula 3:
- Steatite talc — 85
- Clay — 5
- $BaCO_3$ — 10

Metals (1) Nickel iron alloy wires—95% nickel, 5% iron.
(2) Silverplated copper foil—.005 thick copper strip with electrodeposited silver .0005 to .001" thick.
(3) Silverplated brass rings—rings of brass with electrodeposited silver .0005 to .001" thick.

Bonding layer

Formula 1:                                   Percent by weight
- Finely divided silver metal — 95
- Glass powder: PbO, 26%; $B_2O_3$, 10%; $Na_2O$, 3%; $SiO_2$, 61% — 5

Solids — 100

Vehicle:                                     Percent by weight
- Toluol — 70
- Ethyl cellulose — 20
- Pine rosin (Staybelite) — 10

Liquids — 100

Liquid and solid blended to obtain a paste or paint.

Formula 2:                                   Percent by weight
- Precipitated silver — 95
- Bismuth oxide — 0.5
- Glass powder: $Al_2O_3$, 9% glass; PbO, 37%; $B_2O_3$, 10%; CaO, 4%; $SiO_2$, 40% — 9.5

Solids — 100

Vehicle:                                     Percent by weight
- Metro cellulose — 30
- Butyl acetate — 10
- Monoethyl glycol ether — 20
- Nitrobenzine — 40

Liquids — 100

Liquid and solid blended to obtain a paste or paint.

While for purposes of illustration several forms of this invention have been disclosed, other forms thereof may become apparent to those skilled in the art upon reference to this disclosure and, therefore, this invention is to be limited by the scope of the appended claims.

I claim as my invention:

1. The method of physically and electrically conductively joining a metallic member to a ceramic member comprising forming a joined assembly by juxtapositioning the metallic member and the ceramic member and interposing between and contacting the metallic member and the ceramic member solely with a bonding layer consisting essentially of finely divided silver and finely divided glass suspended in a carrying vehicle, heating the joined assembly to a temperature insufficient to affect the metallic or ceramic members or to melt the silver component of the layer but sufficient at least to sinter the glass component of the layer whereby to bond the layer to the ceramic and metallic members, and cooling the joined assembly to solidify the bonding layer with the finely divided silver component dispersed therein whereby firmly physically to bond together the metallic and ceramic members and electrically conductively to join the same.

2. The method of physically and electrically conductively joining a metallic member to a ceramic member comprising forming a joined assembly by juxtapositioning the metallic member and the ceramic member and interposing between and contacting the metallic member and the ceramic member solely with a bonding layer consisting essentially of finely divided silver and finely divided glass suspended in a resinous carrying vehicle, heating the joined assembly to a temperature insufficient to affect the metallic or ceramic members or to melt the silver component of the layer but sufficient at least to destroy the resin component and to sinter the glass component of the layer whereby to bond the layer to the ceramic and metallic members, and cooling the joined assembly to solidify the bonding layer with the finely divided silver component dispersed therein whereby firmly physically to bond together the metallic and ceramic members and electrically conductively to join the same.

3. The method of physically and electrically conductively joining a metallic member to a ceramic member comprising, selecting a metallic member which will resist temperatures of 1000 degrees F. to 1600 degrees F. without oxidation or corrosion, selecting a ceramic member which will resist temperatures of 1000 degrees F. to 1600 degrees F. without sintering or melting, forming a joined assembly by juxtapositioning the metallic member and the ceramic member and interposing between and contacting the metallic member and the ceramic member solely with a bonding layer consisting essentially of finely divided silver and finely divided glass suspended in a carrying vehicle, the finely divided glass component of the bonding layer sintering or melting at temperatures within 1000 degrees F. to 1600 degrees F., heating the joined assembly to a temperature within the range of 1000 degrees F. to 1600 degrees F. at least to sinter the glass component of the layer whereby to bond the layer to the ceramic and metallic members, and cooling the joined assembly to solidify the bonding layer with the finely divided silver component dispersed therein whereby firmly physically to bond together the metallic and ceramic members and electrically conductively to join the same.

4. A joined assembly comprising a metallic member firmly physically bonded and electrically conductively joined to a ceramic member solely by a bonding layer consisting essentially of solid glass with finely divided silver dispersed therein and firmly bonded to the metallic and ceramic members.

5. The method of physically and electrically conductively joining a metallic member to a ceramic member comprising forming a joined assembly by juxtapositioning the metallic member and the ceramic member and interposing between and contacting the metallic member and the ceramic member solely with a paste-like bonding layer including solids consisting essentially of a large majority of finely divided silver and a minor proportion of finely divided glass and a resinous carrying vehicle suspending the solids, heating the joined assembly to a temperature insufficient to affect the metallic or ceramic members or to melt the silver component of the layer but sufficient at least to destroy the resinous component and to sinter the glass component of the layer whereby to bond the layer to the ceramic and metallic members, and cooling the joined assembly to solidify the bonding layer with the finely divided silver component dispersed therein whereby firmly physically to bond together the metallic and ceramic members and electrically conductively to join the same.

6. The method of physically and electrically conductively joining a metallic member to a ceramic member comprising, selecting a metallic member which will resist temperatures of 1000 degrees F. to 1600 degrees F. without oxidation or corrosion, selecting a ceramic member which will resist temperatures of 1000 degrees F. to 1600 degrees F. without sintering or melting, forming a joined assembly by juxtapositioning the metallic member and the ceramic member and interposing between and contacting the metallic member and the ceramic member solely with a paste-like bonding layer including solids consisting essentially of a large majority of finely divided silver and a minor proportion of finely divided glass and a resinous carrying vehicle suspending the solids, the resinous component of the bonding layer being destroyed and the finely divided glass component of the bonding layer sintering or melting at temperatures within 1000 degrees F. to 1600 degrees F., heating the joined assembly to a temperature within the range of 1000 degrees F. to 1600 degrees F. at least to destroy the resinous component and to sinter the glass component of the layer whereby to bond the layer to the ceramic and metallic members, and cooling the joined assembly to solidify the bonding layer with the finely divided silver component dispersed therein whereby firmly physically to bond together the metallic and ceramic members and electrically conductively to join the same.

7. A joined assembly comprising a metallic member firmly physically bonded and electrically conductively joined to a ceramic member solely by a bonding layer firmly bonded to the metallic and ceramic members and consisting essentially of a minor proportion of solid glass and a large majority of finely divided silver dispersed therein.

References Cited in the file of this patent

UNITED STATES PATENTS

| | | |
|---|---|---|
| 2,390,354 | Clapp | Dec. 4, 1945 |
| 2,397,744 | Kertesz | Apr. 2, 1946 |
| 2,423,922 | Arndt | July 15, 1947 |
| 2,679,568 | Smith et al. | May 25, 1954 |

FOREIGN PATENTS

| | | |
|---|---|---|
| 626,357 | Great Britain | July 13, 1949 |